(12) United States Patent
Heilman et al.

(10) Patent No.: US 11,054,292 B2
(45) Date of Patent: Jul. 6, 2021

(54) MATERIAL FLOW MONITORING SYSTEM AND METHOD

(71) Applicant: Intelligent Agricultural Solutions, LLC, Fargo, ND (US)

(72) Inventors: Joseph A. Heilman, Fargo, ND (US); Robert J. Volesky, Fargo, ND (US); Robert M. Allen, Detroit Lakes, MN (US); Barry D. Batcheller, West Fargo, ND (US); Joel J. Kern, Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 569 days.

(21) Appl. No.: 15/969,484

(22) Filed: May 2, 2018

(65) Prior Publication Data
US 2019/0204130 A1    Jul. 4, 2019

Related U.S. Application Data

(60) Provisional application No. 62/613,012, filed on Jan. 2, 2018.

(51) Int. Cl.
| | |
|---|---|
| *G01F 1/66* | (2006.01) |
| *G01F 1/20* | (2006.01) |
| *G01F 1/74* | (2006.01) |
| *G01S 19/14* | (2010.01) |
| *A01C 7/10* | (2006.01) |
| *A01C 15/04* | (2006.01) |

(52) U.S. Cl.
CPC .............. *G01F 1/666* (2013.01); *A01C 7/105* (2013.01); *A01C 15/04* (2013.01); *G01F 1/206* (2013.01); *G01F 1/74* (2013.01); *G01S 19/14* (2013.01)

(58) Field of Classification Search
CPC . G06F 1/666; G06F 1/206; G06F 1/74; A01C 7/105; A01C 15/04; G01S 19/14; G01F 1/666; G01F 1/206; G01F 1/74
See application file for complete search history.

(56) References Cited

U.S. PATENT DOCUMENTS

| | | |
|---|---|---|
| 5,177,470 A | 1/1993 | Repas |
| 5,831,539 A | 11/1998 | Thomas et al. |

(Continued)

FOREIGN PATENT DOCUMENTS

| | | |
|---|---|---|
| EP | 2798930 | 5/2018 |
| EP | 3014968 | 9/2018 |
| GB | 2012535 | 8/1979 |

*Primary Examiner* — Bryan Bui (57) ABSTRACT

A dry-particulate monitoring system for a machine that distributes dry-particulate to the ground by metering product into a flowing airstream. The airstream is diverted into several tubes mounted on booms covering some horizontal distance. At the end of each tube is a deflector designed to direct the flow of material to a desired location with a particular coverage. An acoustic-based sensor of the preferred embodiment is placed on each deflector to detect material flowing through each tube or pipe or against the deflector. The information that is gathered from the sensors is sent to the dry-particulate spreader operator, who is able to view the real time operation of the dry-particulate flow. The system may be capable of detecting presence or absence of flow (i.e., blockage), or may detect variance of flow in individual pipes over time, or variances of flow between different pipes.

20 Claims, 10 Drawing Sheets

(56) References Cited

U.S. PATENT DOCUMENTS

| | | |
|---|---|---|
| 7,450,019 B1 | 11/2008 | Spain |
| 8,504,310 B2 | 8/2013 | Landphair et al. |
| 8,928,486 B2 | 1/2015 | Hui et al. |
| 9,330,062 B2 * | 5/2016 | Thurow ................. A01C 7/105 |
| 9,565,798 B2 | 2/2017 | Baker |
| 10,255,670 B1 * | 4/2019 | Wu ........................ H04N 7/183 |
| 2017/0080455 A1 | 3/2017 | Posselius et al. |

* cited by examiner

MATERIAL FLOW MONITORING SYSTEM AND METHOD

CROSS-REFERENCE TO RELATED APPLICATION

This application claims priority in U.S. Provisional Patent Application No. 62/613,012 Filed Jan. 2, 2018, which is incorporated herein by reference.

BACKGROUND OF THE INVENTION

I. Field of the Invention

The present invention relates generally to the field of precision agriculture, and more specifically to a material flow sensing system for dry-particulate spreaders, including but not limited to self-propelled floaters and pull-type particulate spreaders.

II. Description of the Related Art

Solutions for blockage and flow sensing in dry-particulate spreaders are desired. Dry-particulate spreaders are machines that are used to spread fertilizer and other dry-particulate onto fields typically at the beginning or end of a crop season. Dry-particulate spreaders are typically owned by commercial entities and are contracted out to farmers along with operators, rather than farmers owning and operating these dry-particulate spreaders. While this is common practice in commercial farming and creates a more cost-effective environment when it comes to fertilizing, the current efficacy of dry-particulate spreaders is less than ideal.

Problems arise because dry-particulate spreaders currently have no system in place that detects dry-particulate flow, distribution quality, or blockage of flow. Yet blockage and/or uneven distribution of dry-particulate is common with these machines, which can result in uneven fertilization of fields. Telltale signs of uneven fertilization are unequal growth of crops or barren patches in crop fields. Both of these issues result in crop loss for farmers, and therefore loss of profit.

Heretofore there has not been a system or method specifically for detecting flow, distribution quality, and blockage of flow in dry-particulate spreaders such that the machine can indicate to a dry-particulate spreader operator the occurrence of blockages and/or uneven distribution. Thus, what is needed in the art is a system and method for detecting distribution and blockage for dry-particulate spreaders.

BRIEF SUMMARY OF THE INVENTION

The conception of this system involves a machine that distributes dry-particulate to the ground by metering product into a flowing airstream. Said airstream is diverted into several tubes that are mounted on booms covering some horizontal distance. At the end of each tube is a deflector. Said deflector is generally a piece of metal that is designed to direct the flow of material to a desired location (e.g., soil in a field) with a particular coverage.

The acoustic-based sensor of the preferred embodiment is placed on each deflector to detect material flowing through each tube or against the deflector. The information that is gathered from the sensors is sent to the dry-particulate spreader operator, who is able to view the real time operation of the particulate flow. The system may be capable of detecting presence or absence of flow (i.e., blockage), or may detect variance of flow in individual tubes over time, or variances of flow between different tubes. Detecting variance of flow will assist machine operators with ensuring that the dry-particulate is being distributed in an acceptable way.

Said sensors may be adhered to the rear-side of deflectors; said sensors use the deflectors as tympanic membranes. The energy collected by the tympanic membrane is transmitted through an auditory tube of some length terminating at an Electronic Control Unit ("ECU"), which contains a series of microphones such as microelectromechanical system ("MEMS") microphones. The information from the MEMS is processed and transmitted to a Controller Area Network (CAN), which is connected to a central gateway communication computing device. The information is aggregated, processed, and presented to the operator in the cabin of the dry-particulate spreader.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning. Additional examples include computing devices such as a mobile smart device including a display device for viewing a typical web browser or user interface will be commonly referred to throughout the following description. The type of device, computer, display, or user interface may vary when practicing an embodiment of the present invention. A computing device could be represented by a desktop personal computer, a laptop computer, "smart" mobile phones, PDAs, tablets, or other handheld computing devices.

II. Preferred Embodiment Material Flow Monitoring System 52

Figure 1:
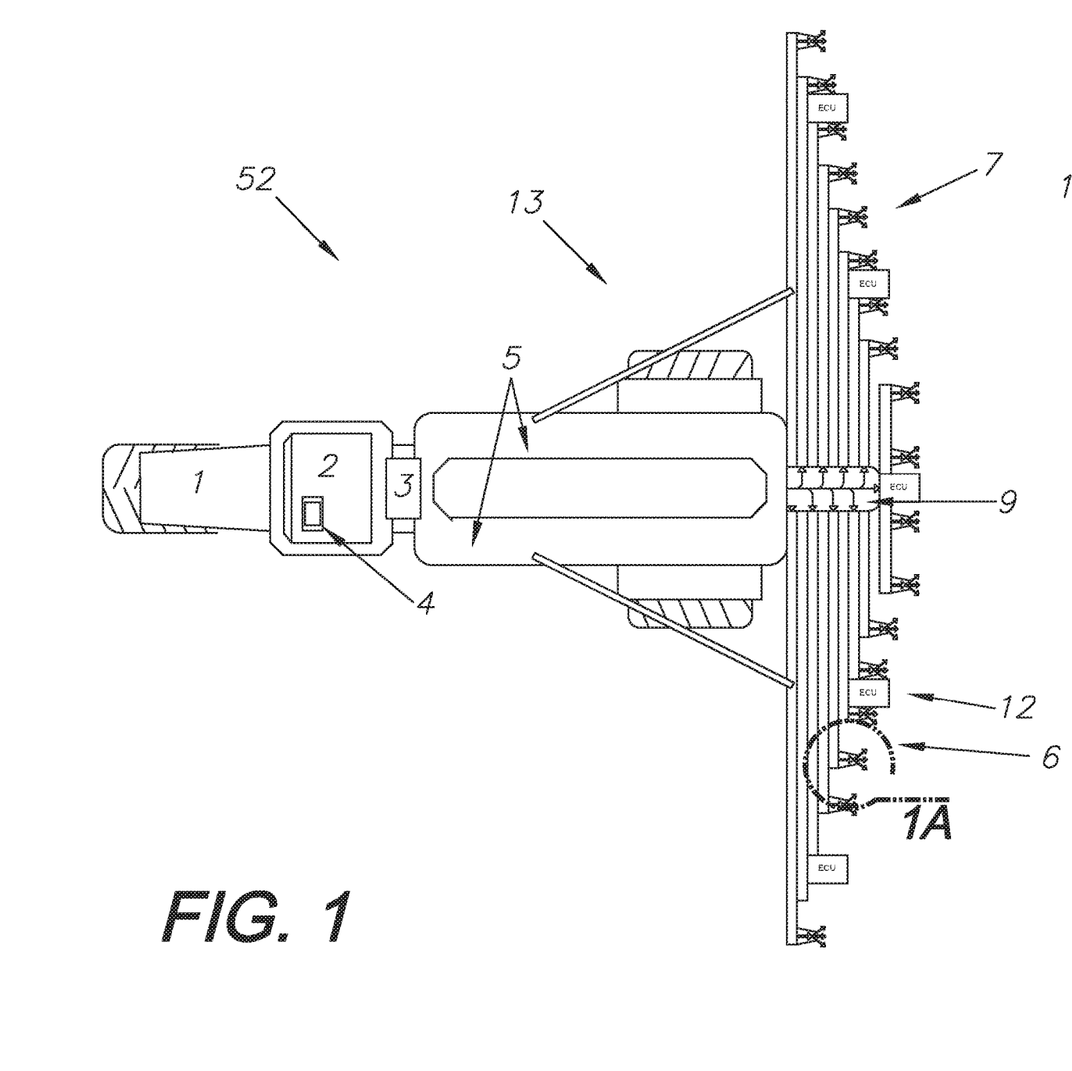
FIG. 1 shows an overhead view of a typical floater machine with a close-up of a deflector with an acoustic sensor attached.
Figure 1A:
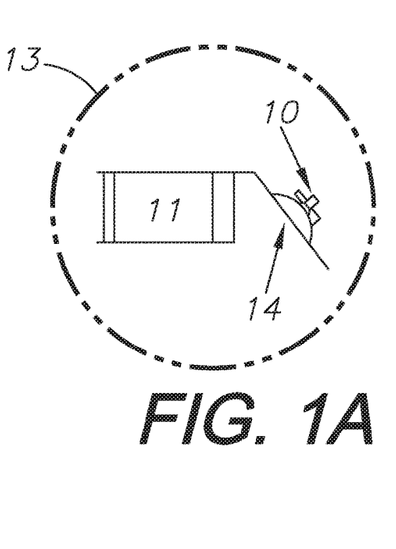
FIG. 1A is a detailed view of a deflector element taken about the circle of FIG. 1.
Figure 2A:
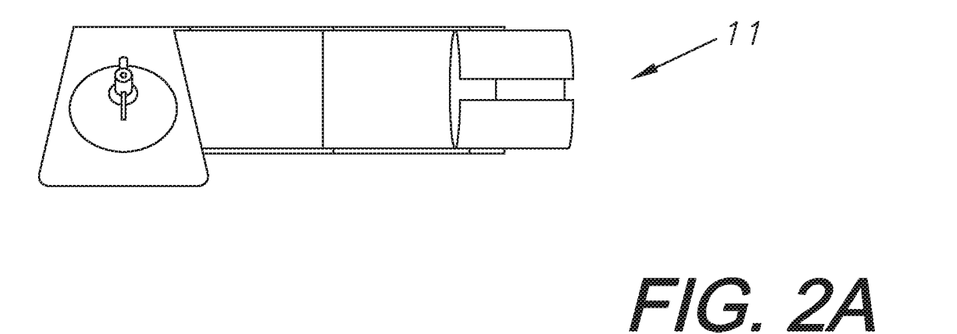
FIG. 2A shows a front angle view of a plate deflector.
Figure 2B:
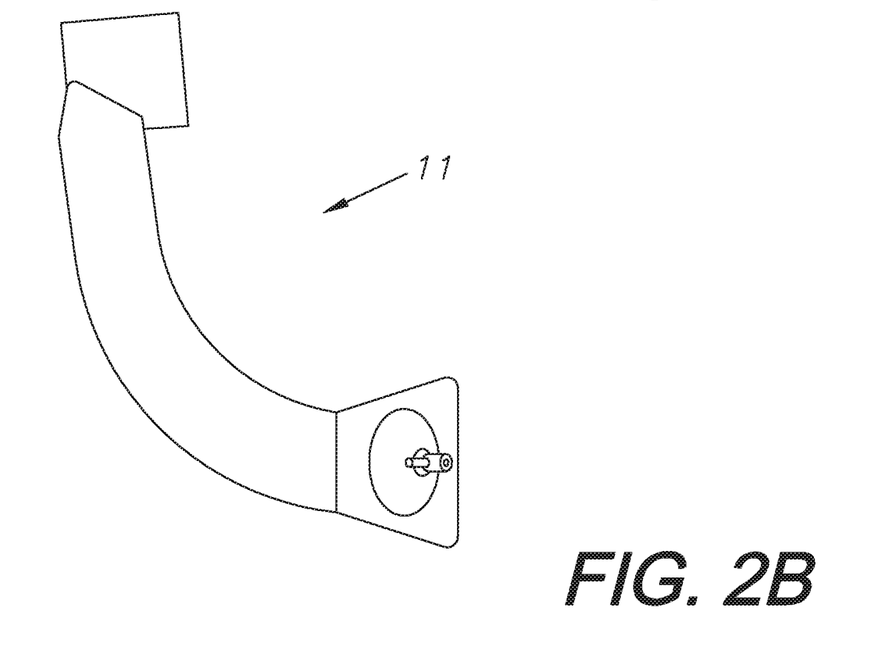
FIG. 2B shows a top down angle view of a plate deflector.
Figure 2C:
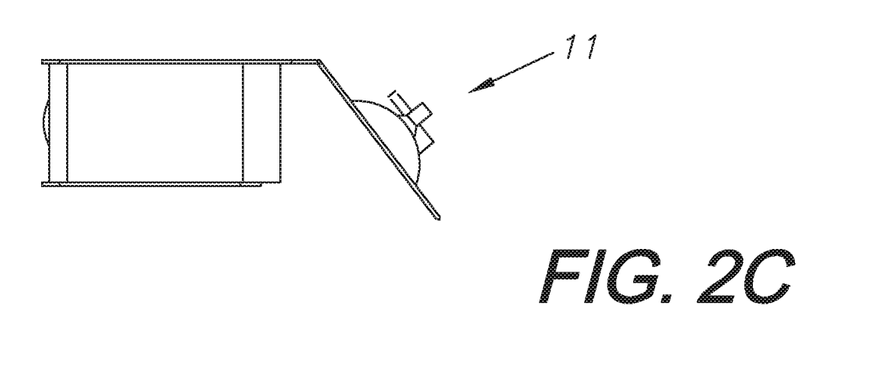
FIG. 2C shows a side angle view of a plate deflector.
Figure 3:
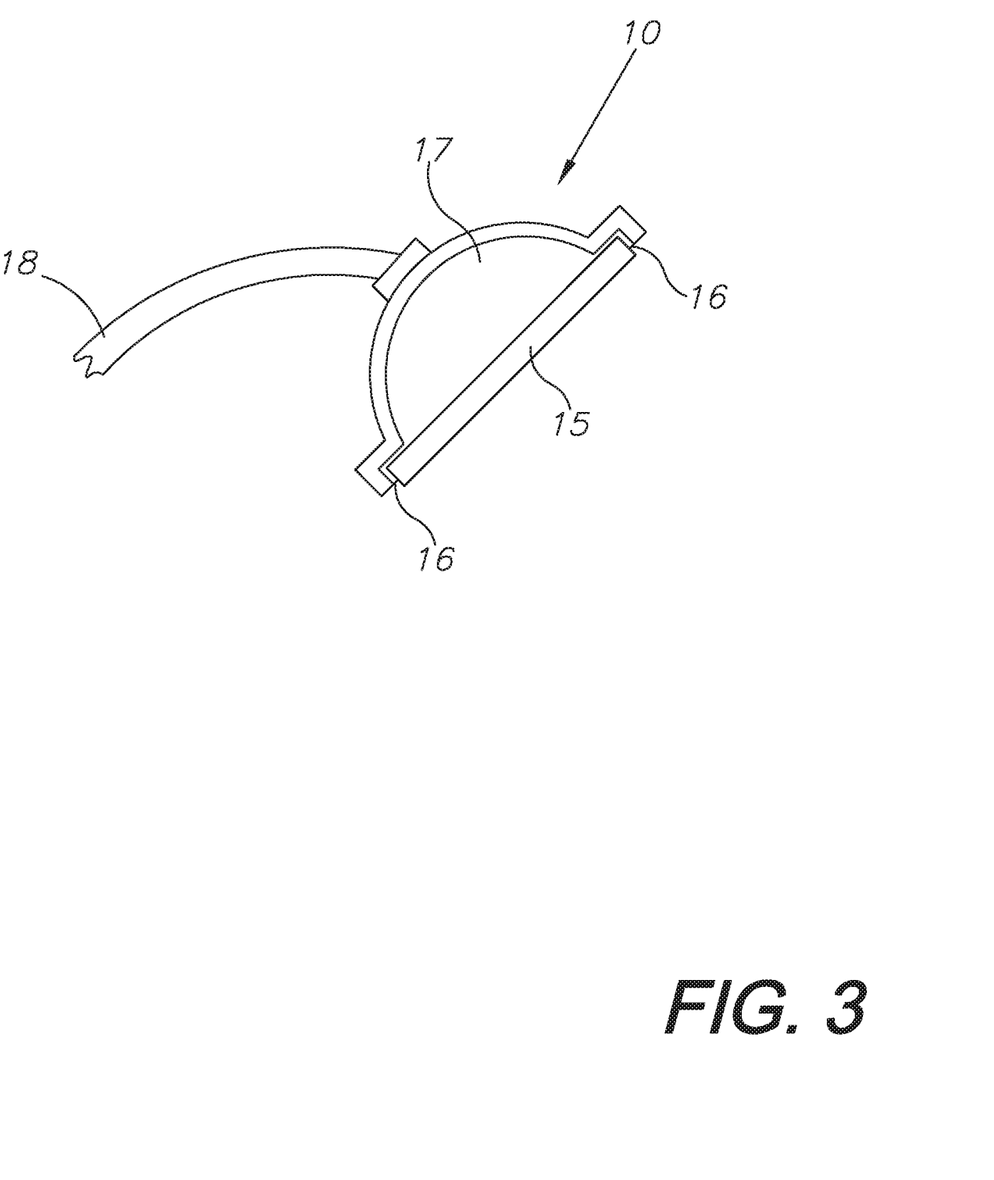
FIG. 3 shows an acoustic sensor.
Figure 4A:
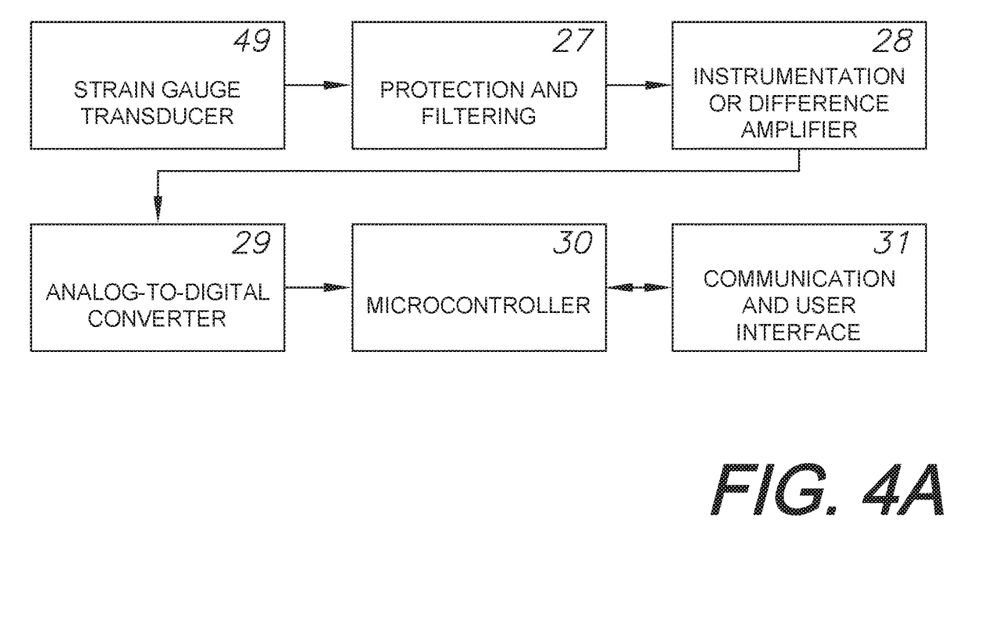
FIG. 4A shows a block diagram of a strain gauge transducer.
Figure 4B:
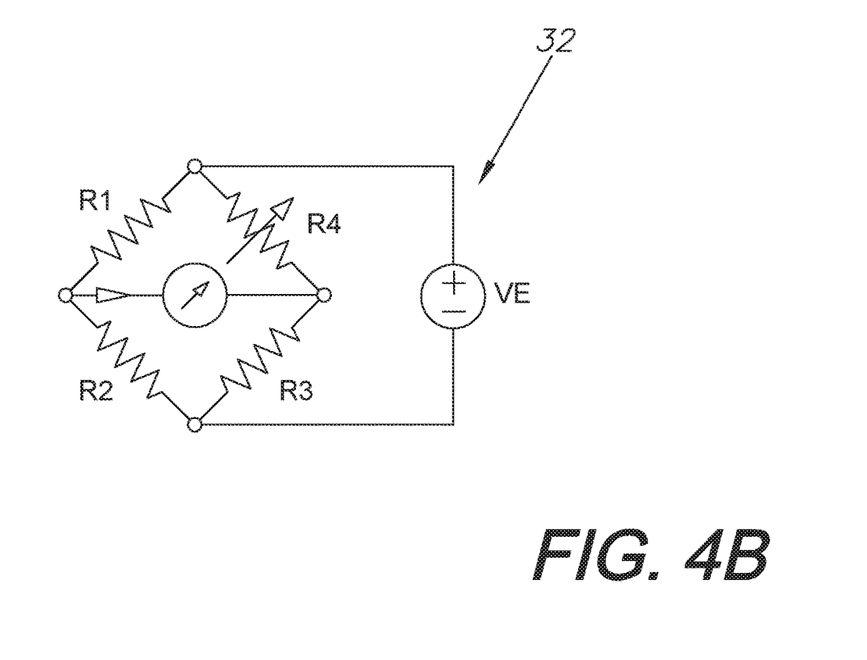
FIG. 4B shows a quarter Wheatstone bridge circuit.
Figure 5:
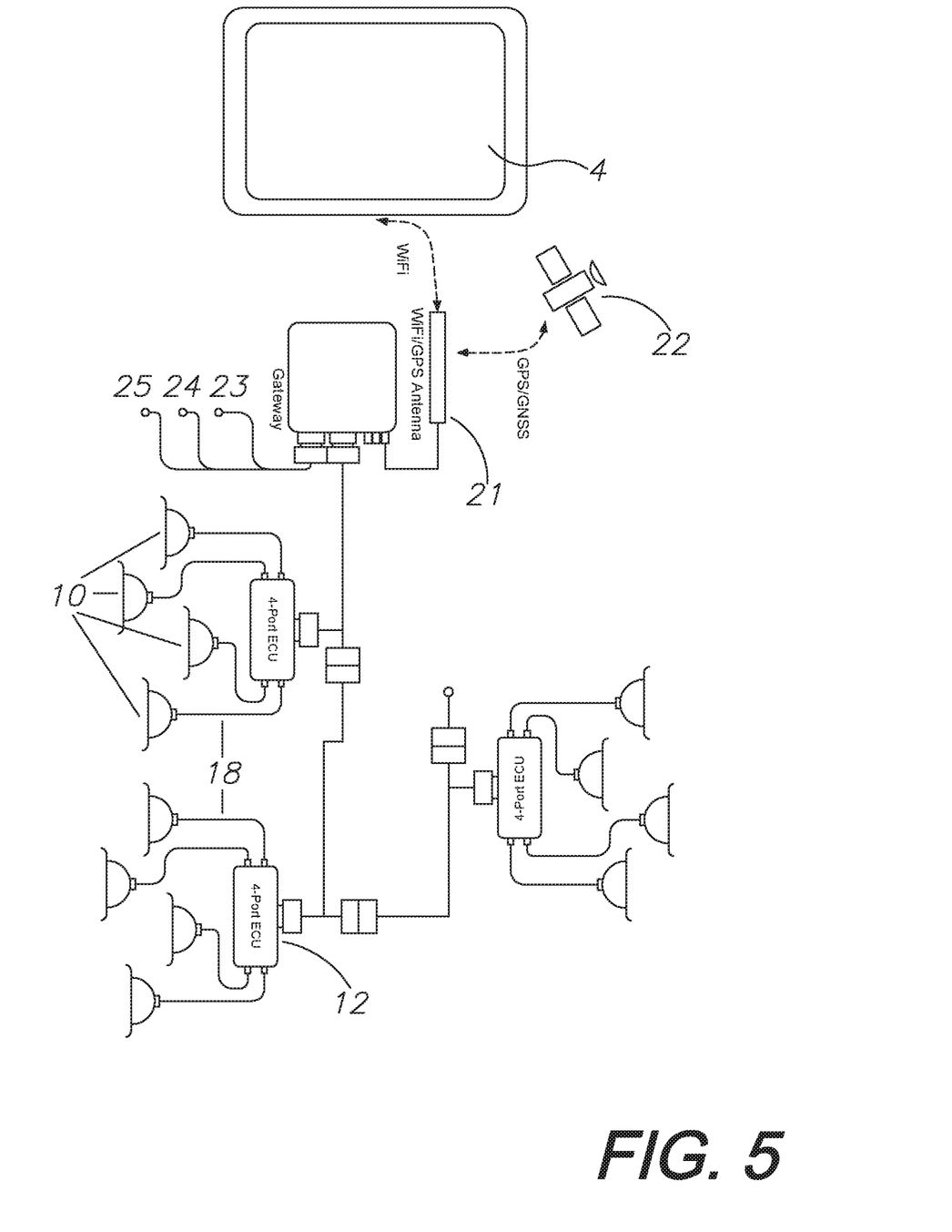
FIG. 5 shows the system hierarchy context.

FIG. 1 displays the components of a typical dry-particulate spreader 13, such as a floater 1 on which this system may be used. Context is given for the present method and system, including the aforementioned acoustic sensors that are designed to detect flow, distribution, and blockage. FIG. 1A shows a detailed view of an acoustic sensor 10 adhered to a deflector 11. A floater 1 is equipped with an operator cab 2 where the operator sits. Inside the cab is the operator's mobile device 4; said device can be mounted to the dash or placed otherwise. Outside and behind the cab is the central gateway device 3 which is mounted to a surface on the machine and is connected to various ECUs 12. The ECUs 12 connect the mobile device 4 to the acoustic sensors 10 via a wireless connectivity signal through the gateway 3. The mobile device 4, such as a smart phone or personal computer, could also communicate to the ECUs 12 either wirelessly across a wireless network or be hardwired into the system using an Ethernet cable, USB cable, or other suitable connection.

Before a floater 1 enters a field, dry-particulate is placed into bins 5 that are located in the middle and back sections of a floater 1. A typical floater 1 is equipped with chain-link drag belts or screw conveyors (not pictured) that are located below or inside of the bins. Said chain-link drag belts function like conveyer belts and move the product towards the rear of the machine to disperse dry-particulate via a funnel box and a manifold 9 into boom tubes 8. A forced airstream inside the manifold 9 conveys the particulate through the tubes 8. Upon exiting the tubes 8, the dry-particulate hits deflector plates 14 on the way to the ground. When the dry-particulate hits the deflector plates 14, acoustic sensors 10 attached to the outside of the deflector plates 14 are used to monitor vibrations of the metal deflector (see FIGS. 2A-2C). The acoustic sensors 10 convert these vibrations into pressure waves that are consumed by an ECU 12. Output signals of the ECU 12 are transmitted via CAN bus to a gateway device 3 which processes the signals and forwards information back to the operator's mobile device 4 in the cab 2 of the floater 1.

FIGS. 2A-2C display three angles of one particular deflector 11 that may be found on a dry-particulate spreader, with an acoustic sensor attached to the outside of the deflector plate 14. As described in FIG. 1, dry-particulate is pushed pneumatically through boom tubes 8 and hits deflector plates 14 before falling to the ground. When the dry-particulate hits said deflector plates 14, it triggers the acoustic sensors that are attached to the plates with strong adhesive (not shown) or other attachment device and sends a signal to the operator of the machine. Other embodiments may use in place of deflectors described in FIG. 3 other styles and types of deflectors including, but not limited to, bracket deflectors, tube deflectors, and plate deflectors.

FIG. 3 shows an acoustic sensor 10 which includes a sensor plate 15 that is mounted over a hollow acoustic chamber 17. The acoustic sensor 10 is made from durable plastic that is meant to withstand harsh environmental conditions and is adhered to a deflector 11 using strong adhesive (not shown) or other attachment device. A gasket 16 is placed between the sensor plate 15 and the acoustic chamber 17 to prevent material from entering the acoustic chamber 17. The auditory tube 18 is also made of durable material and is connected directly to an ECU 12 located on a boom tube 8.

FIG. 4A shows a block diagram of one alternate embodiment, in which a plurality of strain gauges 49 (not shown) are adhered to each dry-particulate spreader deflector 11. When dry-particulate is pneumatically forced through boom tubes 8, the intense air pressure causes the metal of the deflectors 11 to bend just slightly. The strain gauges 49 determine the flow of dry-particulate as it passes by the deflectors 11 and out of the boom tubes 8 onto the ground by sensing the strain caused by the slight bending of the deflectors 11. Said strain gauges are embedded directly into circuit boards (not shown) which are placed into individual plastic enclosures (not shown); said enclosures are attached directly to the boom tubes 8. An alternate ECU (not pictured) that can digitize and convert data to a CAN is part of said strain gauge. In this alternate embodiment, each boom tube 8 has a circuit board and enclosure attached to it (not shown). As shown in the diagram, the strain gauge 49 includes protection and filtering 27 and an instrumentation or difference amplifier 28 to improve data received by the strain gauge. An analog-to-digital converter 29 converts the data from the strain gauge for interpolation and reporting by the microcontroller 30 which is then sent to the user interface 31 of the mobile device 4.

FIG. 4B shows a schematic of a quarter Wheatstone bridge circuit 32. The schematic demonstrates how strain is measured by detecting changes in resistance R4 of the strain gauge, thus, in this case, determining how much dry-particulate is flowing through the boom tube 8 and past the deflector plate 14 that is associated with strain gauge R4. Wheatstone bridges are typically fed into an instrumentation amplifier and digitized by an analog to digital converter. This embodiment is not limited to quarter Wheatstone bridges, but can include other embodiments such as half or full Wheatstone bridges, and other known electric circuits that are capable of measuring the small changes in resistance corresponding to strain.

Other embodiments may use in place of the acoustic-based sensor a strain detecting sensor including, but not limited to, surface acoustic devices, piezoelectric strain sensors, BOTDR (Brillouin optical time-domain reflectometer) and other optical fiber strain sensors.

FIG. 5 illustrates a schematic diagram of a dry-particulate spreader control system. In one embodiment, a GNSS (Global Navigation Satellite System), hereinafter specifically referred to as GPS (Global Positioning System) receiver 25 is linked to a group of GPS satellites 22 and sends location data to a mobile device 4. In the same embodiment, a separate WiFi antenna in a separate housing (not pictured) is linked to a mobile device 4 to allow for internet connectivity via a gateway device 3. In another embodiment, the WiFi antenna and GPS antenna are located in a single housing 21. The gateway device 3 is connected to a power switch 23, a work switch 24, and a GPS receiver 25. The acoustic sensors 10 are individually connected to a 4-port ECU 12, of which there are five, with auditory tubes 18. The illustration demonstrates how each ECU 12 is connected to four sensors 10 and demonstrates where additional ECUs 12 and sensors 10 may be placed. FIG. 5 also shows the particular type of connections that are found in this system.

Figure 6:
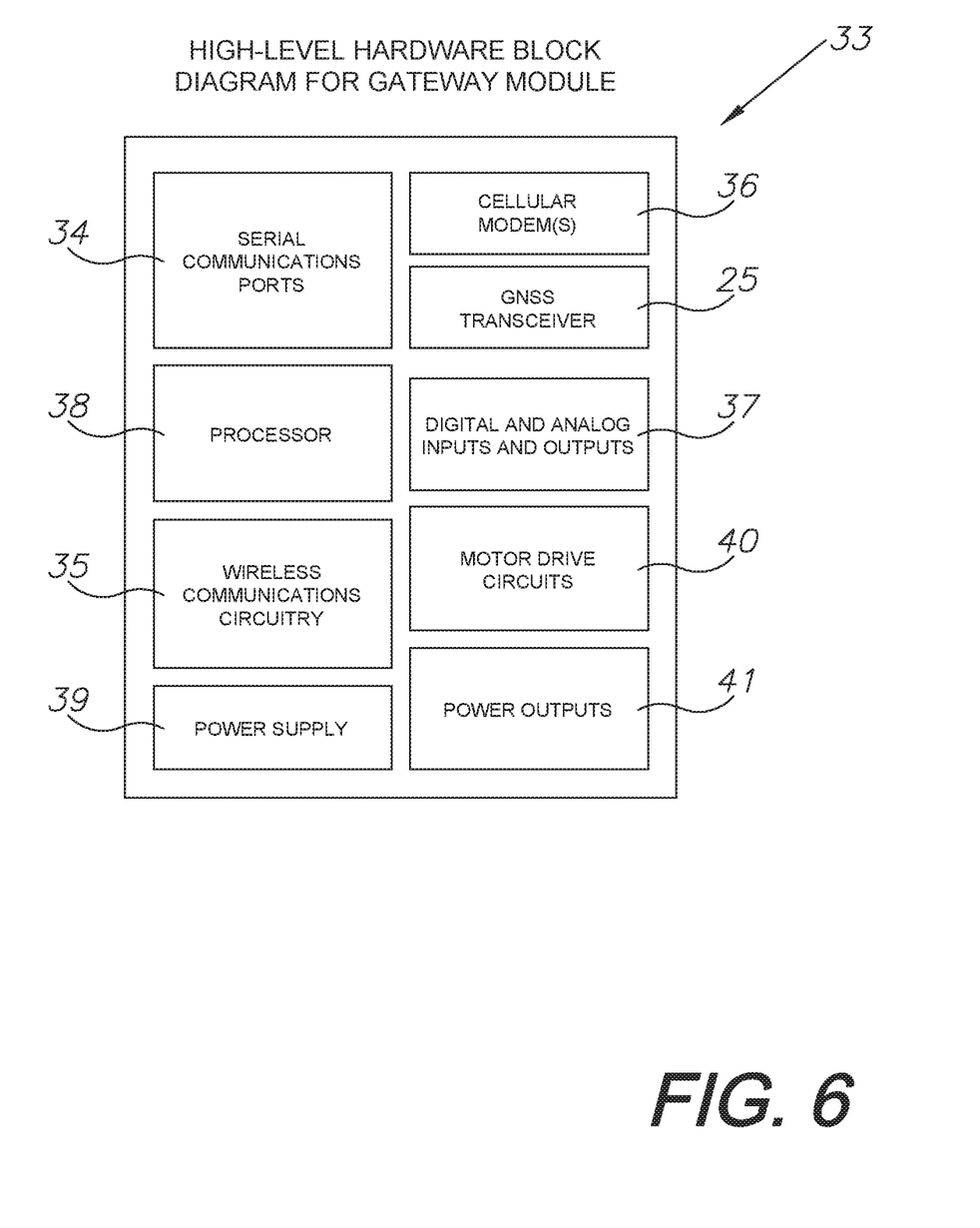
FIG. 6 shows a block diagram of the Gateway 300 IAS kit V1.

FIG. 6 shows the Gateway 300 IAS Kit V1 communication computing platform 33. Said gateway uses wireless connectivity to connect the sensors to a mobile device 4 that can be located in the operator's cab 2 of a floater 1. It uses a CAN interface to connect the ECUs, 12 and, through an RS-232 interface, connects to a GPS receiver 25 to determine the position and velocity of the floater. Said gateway 33 must have an attached antenna in order to use WiFi. As shown, the gateway 33 can have standard external connection ports such as a serial communications port 34, a wireless antenna 35, cellular modem 36, and digital and analog inputs and outputs 37. Necessarily, the gateway includes a processor 38 and power supply 39. Motor drive circuits 40 for activating various components along with power outputs 41 allow the gateway to control various features of the floater or its accessories.

Figure 7:
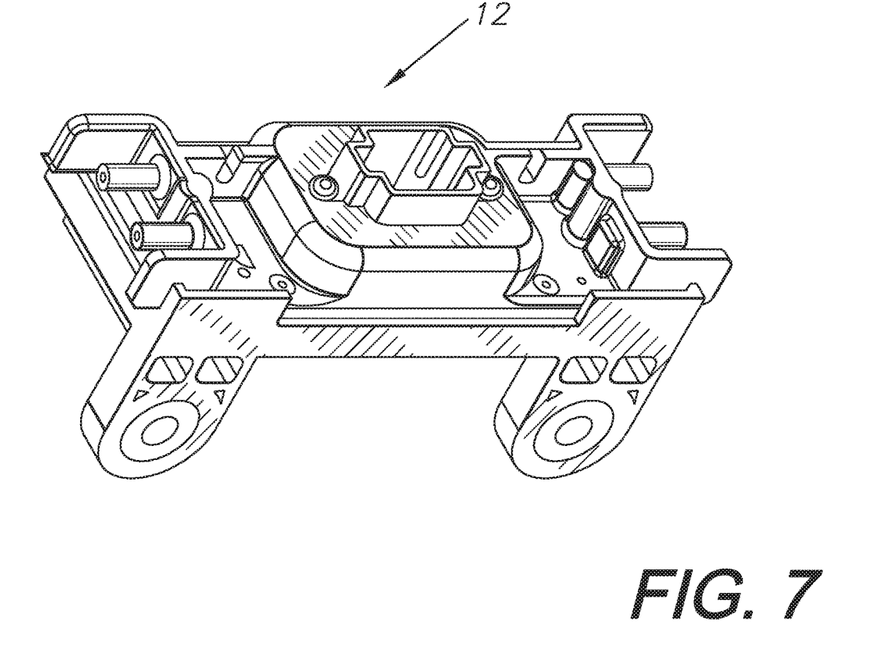
FIG. 7 shows the preferred embodiment of an acoustic sensor ECU.

FIG. 7 shows an ECU 12, which takes in sound through four auditory tube ports 26 and relays information about the sound to the gateway system via CAN bus. The auditory tube ports 26 receive the auditory tubes 18 from the acoustic sensors 10. In one embodiment, a dry-particulate spreader has five ECUs 12 placed on the machine booms; one placed in the middle near the manifold 9, two placed on the right boom 7, and two placed on the left boom 6.

Figure 8:
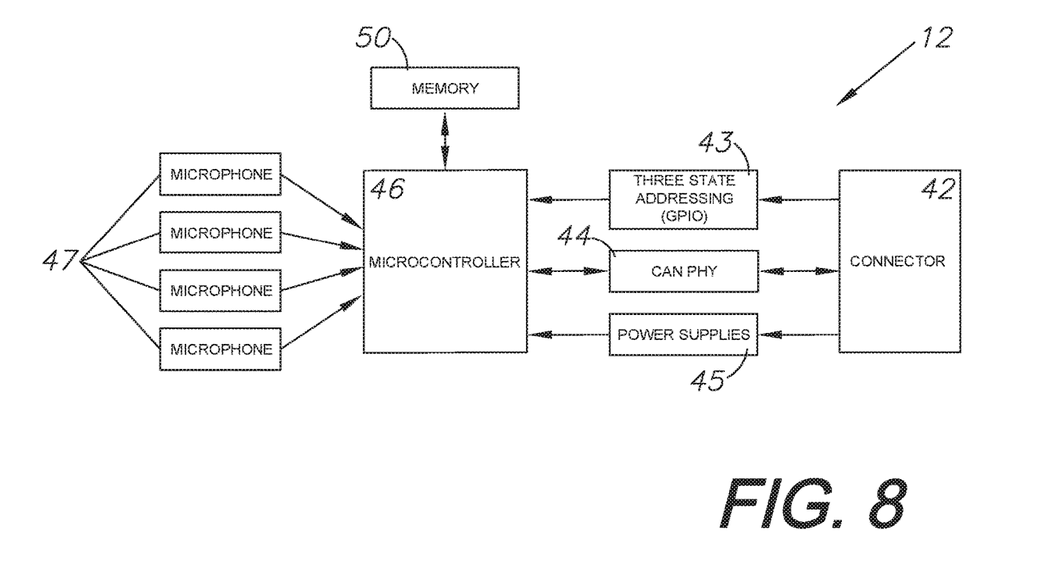
FIG. 8 shows a block diagram of the ECU electrical hardware.

FIG. 8 shows a block diagram of the electrical hardware of ECU 12. The electronic design consists of a connector 42 (environmentally-sealed connector as a preferred embodiment), a three-state input addressing system 43, an input power protection circuit, a power supply 45, a CAN physical layer 44, a microcontroller 46, a memory box 50, and microphones 47.

Figure 9A:
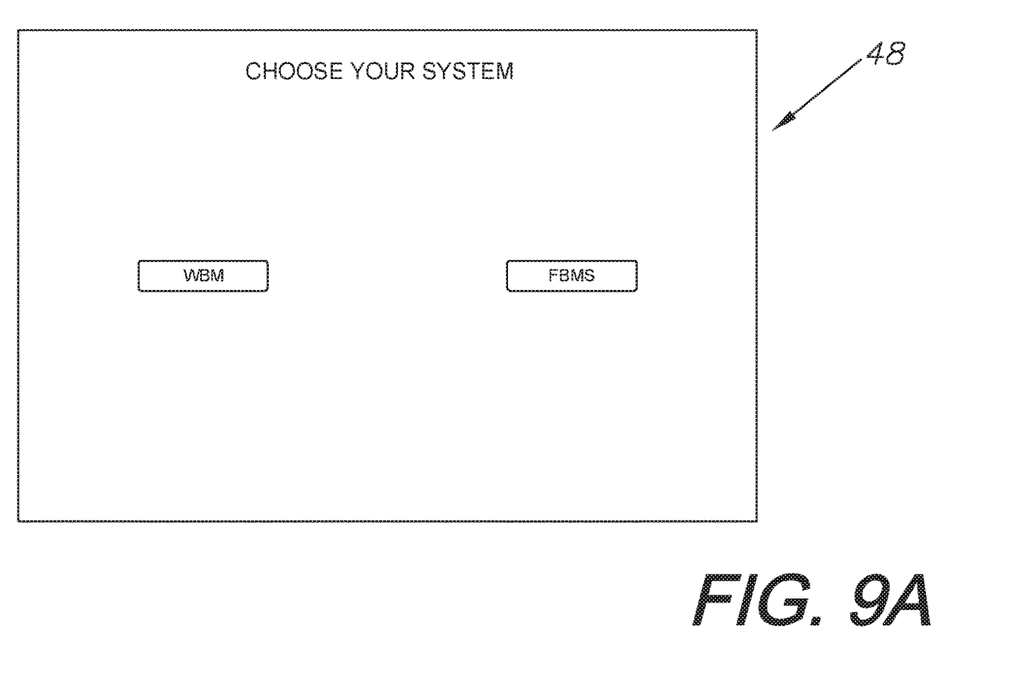
FIG. 9A shows the user interface setup screen.

FIG. 9A shows the setup screen of the user interface 48. Operators must choose either WBS (Wireless Blockage Monitor) or FMBS (Floater Blockage Monitor System) before proceeding to the next screen of the user interface.

Figure 9B:
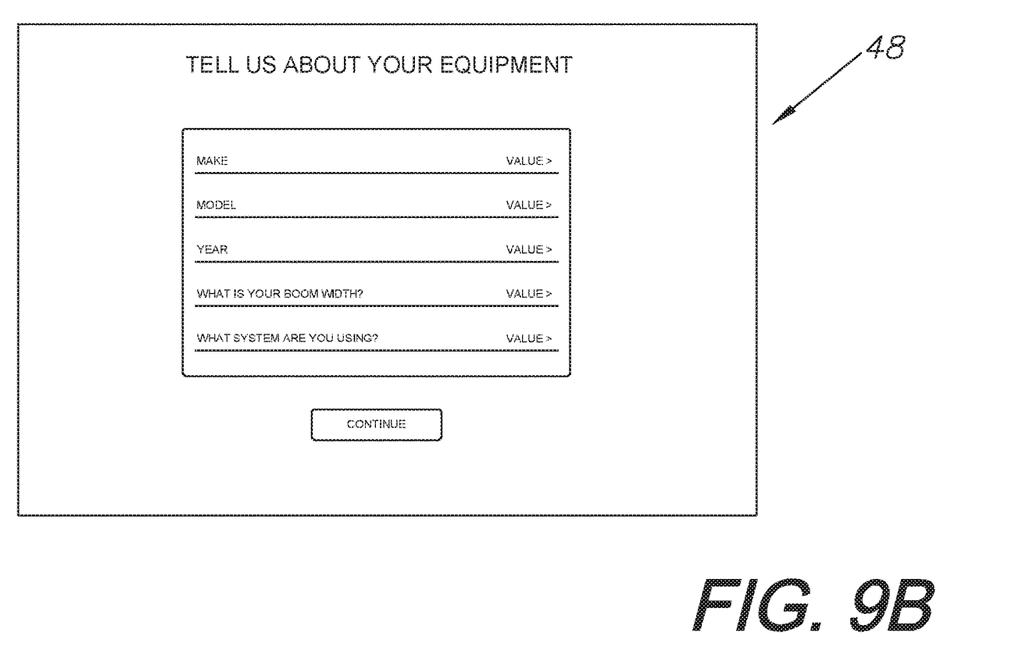
FIG. 9B shows the user interface equipment screen.

FIG. 9B shows the user interface 48 equipment setup screen, which prompts the machine operator to enter information about their equipment.

Figure 9C:
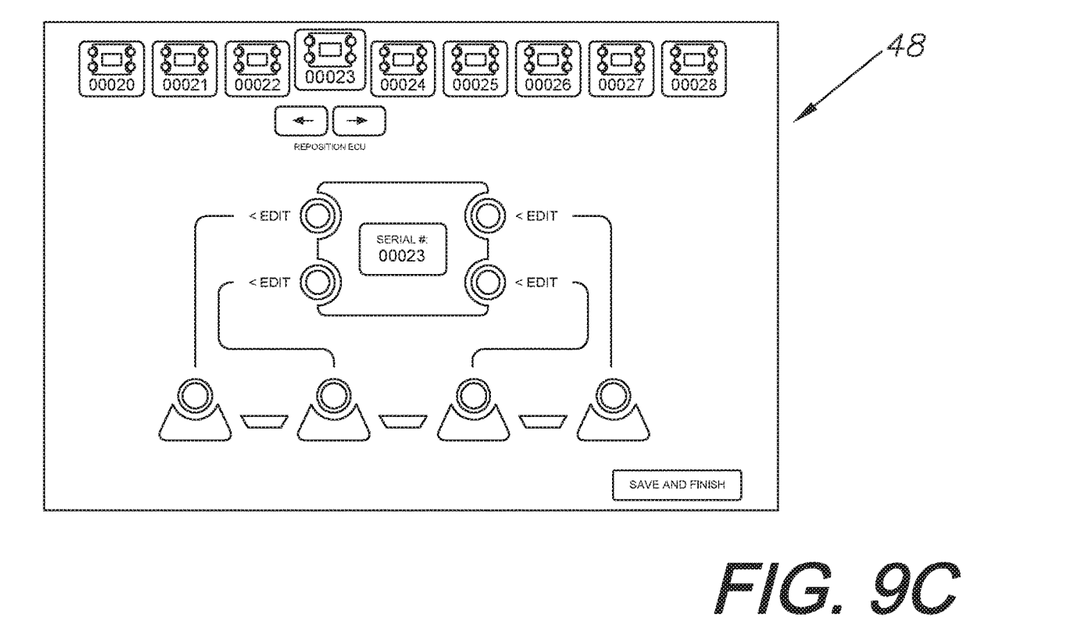
FIG. 9C shows the user interface ECU setup screen.

FIG. 9C shows the user interface for ECU setup, a procedure by which the ECUs 12 are being configured.

Figure 9D:
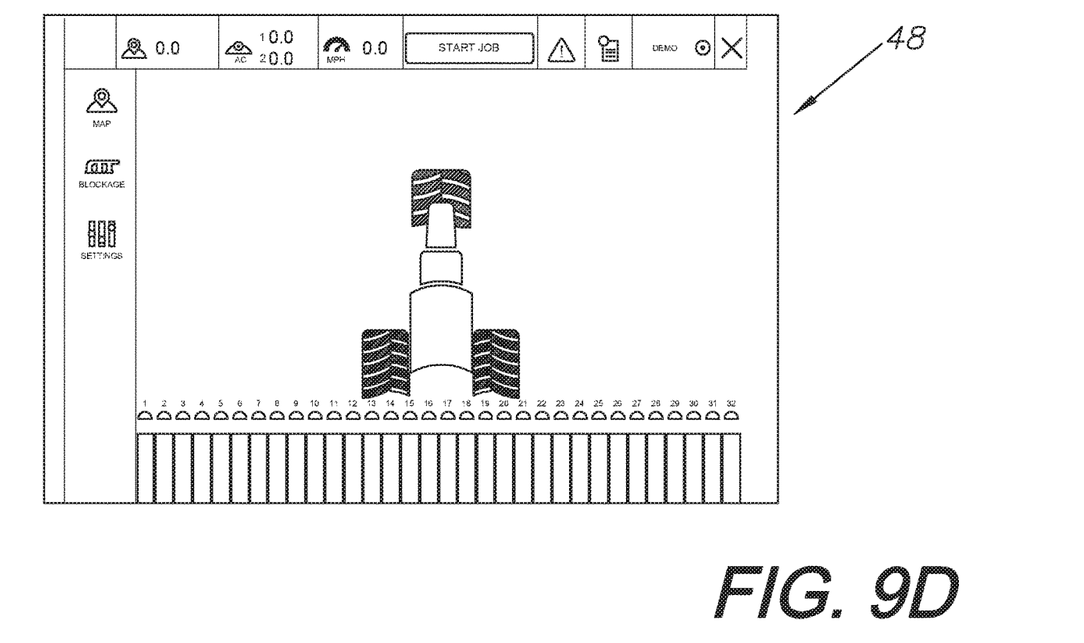
FIG. 9D shows the main screen user interface.

FIG. 9D is an example embodiment of an application interface for an operations tool for use with the present invention and displays an example embodiment of what an operator may see upon entering the program. The user interface includes three main screen options, which include a home button to allow the user to return to the home screen. Other main buttons include a blockage screen button, a map page button which displays the operator's location in a field, and a settings button.

The user interface includes other functions, such as a work switch, mass flow readouts, acre counter, ground speed, silence alarms button, blockage history, and a demo function. An exit button is in the upper right-hand corner can allow the user to return to the home page found in FIG. 5. A "start job" button, when pressed by the operator, initializes a new job. The user interface can also opt to utilize other user tasks, such as GPS signal strength and bin-level.

Figure 9E:
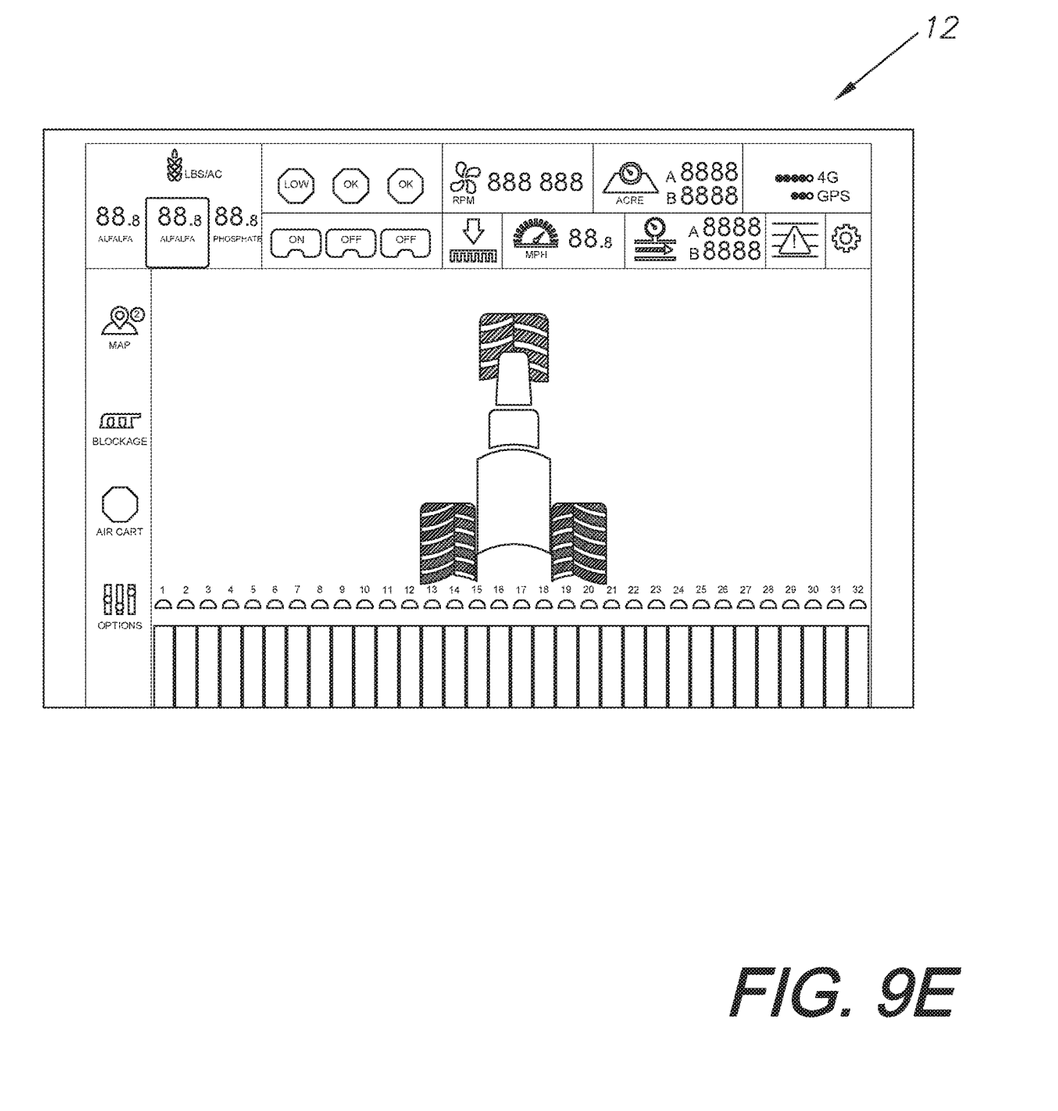
FIG. 9E shows the main screen user interface including a blockage status.

FIG. 9E shows the main screen user interface including an instance of blockage, as indicated by different-colored sensor images. When a sensor detects a blockage or reduced flow in dry-particulate boom tubes 8, the coordinating sensor image will turn yellow or red depending on the severity of the blockage.

In another embodiment, an operator can use a virtual terminal, or VT, for a user interface. Said virtual terminal should include a graphic display and a means to enter data in order to function properly with the previously described sensors. A virtual terminal can be emulated on a mobile device, such an iOS, Android, or PC based tablet which enables wireless connectivity to a remote server; said virtual terminal communicates blockage and flow data to the operator and can relay such data to remote observers.

It is to be understood that the invention can be embodied in various forms and is not to be limited to the examples specifically discussed above. The range of components and configurations which can be utilized in the practice of the present invention is virtually unlimited.

Having thus described the invention, what is claimed as new and desired to be secured by Letters Patent is:

1. A material flow monitoring system for a dry-particulate spreader, the system comprising:
   a dry-particulate spreader;
   said dry-particulate spreader comprising bins for storing dry-particulate, a right boom, and a left boom;
   each of said right and left booms further comprising a plurality of boom tubes, each of said plurality of boom tubes configured to deploy said dry-particulate to a field surface;
   a plurality of deflector plates, one of each of which are placed in proximity to a respective end of said boom tubes;
   a plurality of acoustic sensors, one of each of which are affixed to a respective end of said deflector plates;
   a central gateway connected to a plurality of Electronic Control Units ("ECUs"), each of said ECUs comprising at least one microphone to convert vibration into pressure waves, and each of said ECUs communicatively connected to at least one of said plurality of acoustic sensors for sensing audio data;
   whereby said acoustic sensors are configured to monitor flow of said dry-particulate through said boom tubes based upon acoustic signals generated by said dry-particulate striking said deflector plates; and
   whereby said ECUs report data from said plurality of acoustic sensors to a mobile computing device or devices comprising a processor, data storage, and graphical user interface (GUI) to determine flow irregularity.

2. The system of claim 1, further comprising:
   each of said plurality of acoustic sensors comprising a sensor plate mounted over a hollow acoustic chamber;
   each of said plurality of acoustic sensors affixed to its respective deflector plate using an adhesive; and
   a gasket located between said sensor plate and said acoustic chamber, said gasket configured to prevent material from entering said acoustic chamber; and
   an auditory tube connected from each of said acoustic sensors to a respective ECU.

3. The system of claim 1, wherein said at least one microphone comprises a microelectromechanical system ("MEMS") microphone.

4. The system of claim 1, further comprising;
said mobile computing device processor configured to determine a reduced flow within at least one of said boom tubes; and
said mobile computing device GUI configured to report said reduced flow.

5. The system of claim 1, further comprising;
said mobile computing device processor configured to determine a lack of flow within at least one of said boom tubes; and
said mobile computing device GUI configured to report said lack of flow.

6. The system of claim 1, further comprising:
a global navigation satellite system (GNSS) receiver configured to determine a position and a velocity of a floater;
said GNSS receiver configured to report said position and velocity to said mobile computing device; and
said mobile computing device configured to determine application of said dry-particulate about said field based upon said data from said plurality of said acoustic sensors and from said GNSS receiver determined position and velocity.

7. The system of claim 1, further comprising:
a plurality of strain gauges, each one of said plurality of strain gauges adhered to at least one of said plurality of deflector plates;
each of said strain gauges configured to determine said flow of dry-particulate based upon deflection of said deflector plates;
each of said strain gauges communicatively connected to a respective one ECU, thereby sending data related to said flow of dry-particulate based upon said deflection of said deflector plates to said respective one ECU; and
whereby said ECUs report data from said plurality of strain gauges to said mobile computing device.

8. The system of claim 7, further comprising:
each of said plurality of strain gauges comprising a protection and filtering element;
each of said plurality of strain gauges further comprising a difference amplifier; and
an analog-to-digital converter configured to convert data from each of said plurality of strain gauges for interpolation and reporting by a microcontroller, said microcontroller configured report data converted by said analog-to-digital converter to said mobile computing device.

9. The system of claim 7, further comprising a Wheatstone bridge circuit configured to measure strain detected by each respective one of said plurality of strain gauges.

10. The system of claim 7, further comprising;
determining with said mobile computing device processor a lack of flow within at least one of said boom tubes; and
reporting with said mobile computing device GUI said lack of flow.

11. The system of claim 7, further comprising:
a global navigation satellite system (GNSS) receiver configured to determine a position and a velocity of said dry-particulate spreader;
said GNSS receiver configured to report said position and velocity to said mobile computing device; and
said mobile computing device configured to determine application of said dry-particulate about said field based upon said data from said plurality of said acoustic sensors, strain sensors, and from said GNSS receiver determined position and velocity.

12. The system of claim 1, further comprising;
determining with said mobile computing device processor a reduced flow within at least one of said boom tubes; and
reporting with said mobile computing device GUI said reduced flow.

13. A method of monitoring flow of dry-particulate from a dry-particulate spreader, the method comprising the steps:
connecting a dry-particulate spreader to a floater machine, said dry-particulate spreader comprising bins for storing dry-particulate, a right boom, and a left boom;
spreading said dry-particulate about a field via a plurality of boom tubes connected to each of said right and left booms, whereby said dry-particulate exits said boom tubes and contacts a plurality of deflector plates in proximity with and affixed to each respective one of said plurality of boom tubes;
detecting with plurality of acoustic sensors audio data of said dry-particulate contacting each of said respective deflector plates;
sending said audio data from said acoustic sensors to a plurality of ECUs, each of said ECUs comprising at least one microphone;
reporting said audio data from said plurality of ECUs to a mobile computing device comprising a processor, data storage, and graphical user interface; and
determining flow irregularities with said mobile computing device processor based upon said audio data.

14. The method of claim 13, wherein:
each of said plurality of acoustic sensors comprising a sensor plate mounted over a hollow acoustic chamber;
each of said plurality of acoustic sensors affixed to its respective deflector plate using an adhesive; and
a gasket located between said sensor plate and said acoustic chamber, said gasket configured to prevent material from entering said acoustic chamber; and
an auditory tube connected from each of said acoustic sensors to a respective ECU.

15. The method of claim 13, wherein said at least one microphone comprises a microelectromechanical system ("MEMS") microphone.

16. The method of claim 13, further comprising the steps;
determining with said mobile computing device processor a reduced flow within at least one of said boom tubes; and
reporting with said mobile computing device GUI said reduced flow.

17. The method of claim 13, further comprising the steps;
determining with said mobile computing device processor a lack of flow within at least one of said boom tubes; and
reporting with said mobile computing device GUI said lack of flow.

18. The method of claim 13, further comprising the steps:
determine a position and a velocity of said dry-particulate spreader with a global navigation satellite system (GNSS) receiver;
reporting said position and velocity to said mobile computing device; and
determining with said mobile computing device processor an application of said dry-articulate about said field based upon said data from said plurality of said acoustic sensors and from said GNSS receiver determined position and velocity.

19. The method of claim 13, further comprising the steps:
determining with a plurality of strain sensors said flow of dry-particulate based upon deflection of said deflector plates;
reporting with each of said plurality of strain sensors to a respective one ECU deflection data related to said flow of dry-particulate based upon said deflection of said deflector plates to said respective one ECU;
reporting said deflection data from said plurality of ECUs to a mobile computing device comprising a processor, data storage, and graphical user interface; and
determining flow irregularities with said mobile computing device processor based upon said deflection data.

20. The method of claim 19, further comprising the steps:
determine a position and a velocity of said dry-particulate spreader with a global navigation satellite system (GNSS) receiver;
reporting said position and velocity to said mobile computing device; and
determining with said mobile computing device processor an application of said dry-particulate about said field based upon said data from said plurality of said acoustic sensors, said strain sensors, and from said GNSS receiver determined position and velocity.

* * * * *